3,220,990
POLYMERIZATION OF ACRYLONITRILE IN THE PRESENCE OF A COMPLEX CYANIDE

David W. McDonald and Robert G. Roth, Texas City, Tex., assignors to Monsanto Company, a corporation of Delaware
No Drawing. Filed Feb. 24, 1960, Ser. No. 10,578
11 Claims. (Cl. 260—88.7)

The present invention relates to polymerization of acrylonitrile and, more particularly, to new catalysts or initiators for the polymerization of acrylonitrile.

Polymerization of ethylenically unsaturated compounds is a process of great technical importance. Polymers of acrylonitrile, for example, as well as its copolymers with other polymerizable organic compounds containing an ethylenic double bond are well known and in great demand. Polyacrylonitrile, in particular, has achieved wide use in the production of many valuable commercial products mainly and most recently in the field of artificial fibers. While polymerization of acrylontrile may be effected thermally without a catalyst, one is generally employed. Compounds containing directly linked oxygen or nitrogen atoms such as benzoyl peroxide, potassium persulfate, or $\alpha,\alpha'$azodiisobutyronitrile which generate free radicals are conventionally employed. While these are generally satisfactory, some difficulties have been encountered in their use and new catalysts are constantly being sought for the polymerization process. Accordingly, it is an object of the present invention to provide a new catalyst for the polymerization of acrylonitrile. Other objects and advantages of the invention will become apparent from the following description thereof.

According to the invention, acrylonitrile is polymerized by bringing the monomer in contact under acidic conditions with a catalytic amount of a complex cyanide chosen from the group consisting of alkali metal and ammonium ferrocyanides, the alkali metal and ammonium ferricyanides, and ferri-ferrocyanides commonly known as iron cyanide blues. The following example in which parts are by weight is illustrative of the invention.

Example 1

A 300-mil., three-necked, round-bottomed flask was employed as the polymerization reaction. This was fitted with a mechanical stirrer and the necessary tubing and adapters for purging with inert gas. The reactor flask was immersed in a thermostatically controlled oil bath which was protected from reflected sunlight by means of heavy paper wrapping.

After the reactor was thoroughly purged with natural gas or nitrogen, the initiator was charged to it followed by the addition of acid and a small amount of water to dissolve or wet it. The amount of water added never exceeded the solubility limit of water in acrylonitrile. Dry acrylonitrile (100 ml.) which had been out-gassed for from 20 to 30 min. with nitrogen was then added. The mixture was then stirred rapidly to dissolve any water present in the acrylonitrile. The clear acrylonitrile solution was then stirred gently while it was maintained at a temperature of about 60° C. The flask was examined at regular intervals with a flashlight to detect turbidity caused by the formation of polymer and to determine the induction time for the polymerization. The induction period was designated as the time interval from the mixing of the reactants until polymer was observed in the flask. The conditions and results of a series of polymerization runs conducted in this manner are presented in Table I. Control runs in which no catalyst or initiator was employed are included for comparative purposes. It is evident from the tabulated data that iron cyanide blues, ferricyanides and ferrocyanides are effective under acidic conditions for initiating the polymerization of acrylonitrile.

The invention is not to be considered as limited to the precise conditions set forth in the example. For instance, sodium, lithium and ammonium ferricyanides can be employed as well as the potassium ferricyanide exemplified to initiate the polymerization of acrylonitrile. Likewise,

TABLE I

| Run No. | Water Added (ml.) | Conc. HCl Added (ml.) | Initiator | Amt. of Initiator (g.) | Induction Period (min.) |
|---|---|---|---|---|---|
| 1 | 0 | 0 | None | | >960 |
| 2 | 1.0 | 0 | ----do---- | | >960 |
| 3 | 0 | 0.25 | ----do---- | | >960 |
| 4 | 1.0 | 0.25 | ----do---- | | >960 |
| 5 | 1.0 | 0.25 | Potassium Ferricyanide | 1.0 | 90–120 |
| 6 | 2.0 | 0.25 | ----do---- | 1.0 | 150–180 |
| 7 | 6.0 | 0.25 | ----do---- | 1.0 | 60–105 |
| 8 | 4.0 | 0.25 | Sodium Ferrocyanide | 1.5 | 60–120 |
| 9 | 4.0 | 0.25 | ----do---- | 1.5 | 90–120 |
| 10 | 0 | 0.25 | "Soluble" Prussian Blue | 0.55 | <40 |
| 11 | 1.0 | 0.25 | ----do---- | 0.0034 | 10–15 |
| 12 | 1.0 | 0.25 | ----do---- | 0.00034 | 30–45 |
| 13 | 1.0 | 0.25 | ----do---- | 0.0017 | 5–15 |
| 14 | 1.0 | 0.025 | ----do---- | 0.0017 | 45–60 |
| 15 | 1.0 | 0.0025 | ----do---- | 0.0017 | 105–120 |
| 16 | 0 | 0.25 | Insoluble Prussian Blue | 0.07 | 10–15 |
| 17 | 1.0 | 0.25 | "Manox" Prussian Blue (Filo Corporation). | 0.1 | 15–30 |
| 18 | 1.0 | 0.25 | Chinese Blue (Hilton Davis Co.). | 0.1 | 5–10 |
| 19 | 1.0 | 0.25 | "Texturized" Iron Blue (Mineral Pigments Corp.). | 0.1 | 30–45 |
| 20 | 1.0 | 0.25 | Blackstone Iron Blue (American Cyanamid Co.). | 0.1 | 60–75 | the invention is not limited to sodium ferrocyanide but potassium, lithium and the other alkali metal as well as ammonium ferrocyanides can also be used. Also, other available iron cyanide blues in addition to those specifically mentioned are equally useful in the invention.

The complex cyanides used as initiators or catalysts are generally present in amounts ranging from about 0.0005% to about 5% by weight of the acrylonitrile. Preferably amounts in the range from about 0.001% to about 1.5% are used.

The polymerization is usually carried out at temperatures within the range from about 0° C. to about 100° C. and preferably in the range from about 50° C. to about 75° C. At the lower temperatures, the rate of polymerization is generally low. The higher temperatures may be used particularly when the time of polymerization is to be keut at a minimum, for example, in a continuous process.

Acids other than hydrochloric such as sulfuric, phosphoric and acetic acids can be employed for acidifying the polymerization mixture. The amount of acid employed is not critical and only minor amounts sufficient to maintain the mixture on the acid side of neutral are required. Generally, these lie in the range from about 0.001% to about 1% by weight of the acrylonitrile being polymerized.

What is claimed is:

1. A process for the polymerization of acrylonitrile which consists essentially of subjecting acrylonitrile to homopolymerization under acidic conditions in contact with a complex cyanide chosen from the group consisting of the alkali metal and ammonium ferricyanides, the alkali metal and ammonium ferrocyanides, and the ferri-ferrocyanides known as iron cyanide blues, said complex cyanide being the sole catalyst present in an amount sufficent to initiate the polymerization of said acrylonitrile.

2. The process of claim 1 wherein the complex cyanide is present in an amount within the range from about 0.0005% to about 5% by weight of said acrylonitrile.

3. A process for the polymerization of acrylonitrile which consists essentially of subjecting acrylonitrile to homopolymerization at a temperature from about 0° C. to about 100° C. under acidic conditions with an alkali metal ferricyanide, said alkali metal ferricyanide being the sole catalyst present in an amount sufficient to initiate the polymerization of said acrylonitrile.

4. The process of claim 3 wherein said alkali metal ferricyanide is present in an amount within the range from about 0.0005% to about 5% by weight of said acrylonitrile.

5. A process for the polymerization of acrylonitrile which consists essentially of subjecting acrylonitrile to homopolymerization at a temperature within the range from about 50° C. to about 75° C. under acidic conditions in contact with potassium ferricyanide, said ferricyanide being the sole catalyst present in an amount in the range from about 0.0001% to about 1.5% by weight of said acrylonitrile.

6. A process for the polymerization of acrylonitrile which essentially of subjecting acrylonitrile to homopolymerization at a temperature from about 0° C. to about 100° C. under acidic conditions in contact with an alkali metal ferrocyanide, said alkali metal ferrocyanide being the sole catalyst present in an amount sufficient to initiate the polymerization of said acrylonitrile.

7. The process of claim 6 wherein said alkali metal ferrocyanide is present in an amount within the range from about 0.0005% to about 5% by weight of said acrylonitrile.

8. A process for the polymerization of acrylonitrile which consists essentially of subjecting acrylonitrile to homopolymerization at a temperature within the range from about 50° C. to about 75° C. under acidic conditions in contact with sodium ferrocyanide, said ferrocyanide being the sole catalyst present in an amount in the range from about 0.001% to about 1.5% by weight of said acrylonitrile.

9. A process for the polymerization of acrylonitrile which consists essentially of subjecting acrylonitrile to homopolymerization at a temperature from about 0° C. to about 100° C. under acidic conditions in contact with a ferri-ferrocyanide known as an iron cyanide blue, said iron cyanide blue being the sole catalyst present in an amount sufficient to initiate the polymerization of said acrylonitrile.

10. The process of claim 9 wherein said iron cyanide blue is present in an amount within the range from about 0.0005% to about 5% by weight.

11. A process for the polymerization of acrylonitrile which consists essentially of subjecting acrylonitrile to homopolymerization at a temperature within the range from about 50° C. to about 75° C. and under acidic conditions in contact with soluble Prussian blue, said Prussian blue being the sole catalyst present in an amount in the range from about 0.001% to about 1.5% by weight of said acrylonitrile.

References Cited by the Examiner

UNITED STATES PATENTS

| 2,377,752 | 6/1945 | Britton et al. | 260—88.7 |
| 2,584,823 | 2/1952 | Tucker et al. | 260—88.7 |

FOREIGN PATENTS

| 590,191 | 7/1947 | Great Britain. |

OTHER REFERENCES

Bezier, Chem. Abstracts, vol. 39, page 12 (Bull. Soc. Chim., 11, 48–55, 1944.

Starkweather, Ind. Eng. Chem., 39, 210–222 (1947), pages 212–213 relied upon.

JOSEPH L. SCHOFER, *Primary Examiner.*

MILTON STERMAN, H. N. BURSTEIN, LEON J. BERCOVITZ, *Examiners.*